Feb. 7, 1961 H. FREEMAN 2,970,763
PREDETERMINED PULSE SELECTOR
Filed Feb. 28, 1957
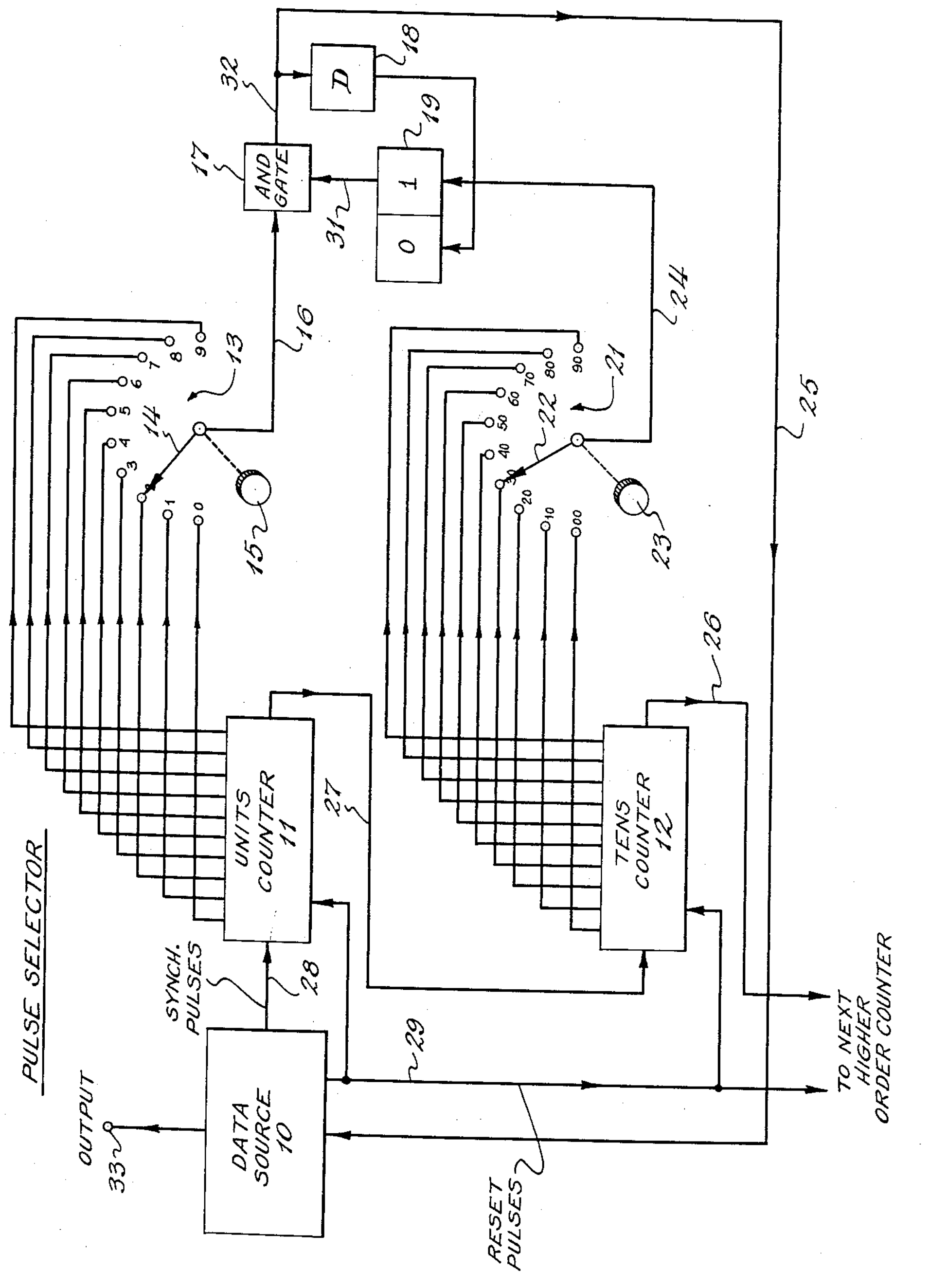
INVENTOR
HERBERT FREEMAN
BY
ATTORNEY United States Patent Office 2,970,763
Patented Feb. 7, 1961

2,970,763

PREDETERMINED PULSE SELECTOR

Herbert Freeman, Great Neck, N.Y., assignor to Sperry Rand Corporation, a corporation of Delaware Filed Feb. 28, 1957, Ser. No. 643,051

2 Claims. (Cl. 235—132)

The invention generally relates to pulse selectors and, more particularly, to a device which permits the selection, by means of relatively slow-acting mechanical switching means, of a specified pulse contained within a repeating finite sequence of high repetition rate pulses.

The invention is particularly adapted to the solution of the problem of reading out information stored on a magnetic drum, for example, at the precise moment when the drum is oriented at a predetermined position. That is, the invention will serve to "read out" information stored at a discrete and predetermined one of a large plurality of positions along the circumference of the magnetic drum every time the magnetic drum, assumed to be continuously rotating, arrives at such predetermined position.

Information to be entered upon or removed from a magnetic drum is usually identified by a correlative particular address, the address normally consisting of an arbitrary number, represented by a predetermined pulse train, which designates a particular location on the drum at which the desired information is to be written in or read out. Pulse selectors and pulse matching circuits have been employed in the prior art for purposes of establishing when the drum is oriented at a predetermined position. The pulse selector commonly employed includes a register in which control pulse address information may be stored and shifted out at a convenient speed. Associated with the prior art register is a relatively complicated pulse matching circuit in which a drum pulse address code, synchronously generated with the rotation of the drum, and the control pulse address code are compared. Upon the concurrence of the two, a control signal is produced for activating the writing or reading heads of the magnetic drum. Such apparatus, however, does not lend itself readily to any manual mode of operation and its speed of operation is usually pre-established in the design of the computer embodying the pulse selector and matching circuit which comprise the magnetic drum position selector.

It is the general object of the present invention to provide a selectable pulse count indicator of simple and reliable design adaptable for use in a computer magnetic drum position selector.

An additional object is to select, by manually positionable mechanical switching means, a specified pulse contained within a repetitive finite sequence of high repetition rate pulses.

Another object is to provide a plurality of high speed pulse counters, each counter being associated with a manually positionable switch, whereby pulse outputs are produced from each respective switch when the position of the switch corresponds with the count stored in its associated counter, and means for storing the outputs of the switches corresponding to a higher order count together with means for comparing the stored output from a higher order switch with that of an immediately preceding lower order switch.

The foregoing and other objects of the present invention, as will appear as the specification proceeds, are accomplished by the provision of a plurality of pulse counters, each counter having a capacity equal to the base of the numbering system employed. In a representative decimal system embodiment, a plurality of decade pulse counters are provided, each corresponding to a respective significant figure of a decimal number. The first counter corresponding to the "units" significant figure is adapted to receive a repetitive series of high repetition rate pulses and to produce a first output upon the occurrence of every tenth input pulse. The first output of the first counter is applied to the input of a second or "tens" counter, corresponding to the "tens" significant figure of a decimal number. Although the present invention is readily adaptable to any extension of the number of pulse counters, only two pulse counters are shown for the sake of simplicity and clarity.

Each of the "units" and "tens" counters produces a second discrete output signal corresponding to the number stored therein. Each second discrete output from each counter is connected to a corresponding terminal of a multi-position manually adjustable mechanical switch. The switches are positioned according to the number of a desired pulse, relative to the occurrence of a reference pulse, which desired pulse is to be selected.

The output of the "units" switch is applied to the first input of an AND circuit, a second input to which is derived from a bistable gate generating device, such as a flip-flop. The output of the "tens" switch is applied to the bistable device to set it into a predetermined one of its bistable states, the predetermined state being such as to satisfy one of the two conditions for conduction of the AND gate.

The output of the AND gate is delayed and then applied to set the bistable device into the other one of its two stable states whereby the AND gate is rendered nonconductive.

The apparatus of the invention operates to produce an output from the AND gate simultaneously with the time of occurrence of a preselected pulse contained within a repetitive sequence of high repetition rate pulses which are applied to the input of the "units" counter. The preselected pulse is determined by the positions of the manual switches, each of which represents a respective significant figure of the number of the preselected pulse with respect to a reference pulse. The reference pulse is produced once for each cycle of the repetitive series of input pulses to the "units" counter and is applied simultaneously to all the counters for purposes of resetting them. In the illustrated embodiment of the invention, the output pulse from the AND gate is utilized to render operative a "read-out" head on a magnetic drum whereby information contained at a preselected position along the circumference of the magnetic drum is read out to the exclusion of the information at all other drum positions.

For a more complete understanding of the present invention, reference should be had to the following description and to the sole figure which illustrates a representative embodiment of the present invention.

In the figure, a source of pulse data is generally designated by the numeral 10. Data source 10 may include, for example, a magnetic drum on which are stored, at discrete locations, separate bits of pulse information. Data source 10 automatically produces, for purposes of the present invention, two outputs 28 and 29. A repetitive sequence of sync pulses appears at output 28, the occurrence of each pulse corresponding to a respective position of the magnetic drum at which are stored discrete bits of pulse information. A lower repetition rate series of pulses appears at output 29, each of the pulses occurring once per complete revolution of the magnetic drum and at a predetermined position thereof. Output 28 is applied to a first input of "units" counter 11 while output 29 is applied to a second input thereto, the latter input operating to reset counter 11 at the time when the rotating magnetic drum passes its reference position.

"Units" counter 11 may be of the form of a beam switching tube well known in the art in which case the sync pulses as applied via line 28 operate to cause the electron stream of the beam switching tube to be sequentially deflected to a succeeding target contained within the beam switching tube. Alternatively, "units" counter 11 may be comprised of a decimal ring counter containing a cascaded series of flip-flops, as it also well known in the art.

Ten outputs are shown emanating from counter 11, representing the numbers 0–9, each of which outputs is respectively applied to a corresponding terminal of manually positionable mechanical switch 13. The arm 14 of switch 13 is positioned by means of control knob 15 and is shown in the sole figure as being positioned at terminal 2. Arm 14 of switch 13 is connected via output line 16 to a first input of AND gate 17.

The second output from counter 11 appears on line 27 whenever the pulse count in counter 11 changes from 9 to 0. The output appearing on line 27 is applied to a second input of "tens" counter 12, a first input to which is obtained from line 29 emanating from data source 10. The pulses appearing on line 29 operate to reset counter 12 in the same manner as they reset counter 11 previously described. "Tens" counter 12 may be precisely the same as "units" counter 11 having a plurality of outputs designated 00 through 90, corresponding to the 0–9 outputs of counter 11 and a separate output appearing on line 26, corresponding to the previously described output appearing on line 27 from counter 11, which is produced whenever the pulse count in counter 12 changes from 90 to 00.

The output on line 26 is shown as being available for application to a next higher order counter (not shown) to illustrate the adaptability of the present invention for extended numbers of individual counters as required in the event that more than 100 sync pulses are produced for each 360° revolution of the magnetic drum of data source 10. For purposes of simplicity and clarity in the description of the present invention, only a "units" and a "tens" counter are shown.

The outputs designated 00 through 90 of counter 12 are respectively applied to the corresponding terminal (designated 00 through 90) of manually positionable mechanical switch 21, the position of whose arm 22 is adjusted by means of control knob 23. Arm 22 of switch 21 is connected to line 24 which, in turn, is coupled to the "one" input of flip-flop 19. That is, when a signal appears on line 24, that signal places flip-flop 19 into that state of conduction corresponding to a "one." An output appears on line 31 from flip-flop 19 when flip-flop 19 is placed into a condition of "one." The output on line 31 is applied to a second input of AND gate 17 for purposes of satisfying one of the two conditions required for conduction thereof. Upon the simultaneous occurrence of outputs on lines 31 and 16, an output is produced from AND gate 17 on line 32. The output on line 32 is delayed in delay 18 and is then applied to the "0" input of flip-flop 19. Thus, upon the occurrence of an output from delay 18, flip-flop 19 is placed into that condition whereby no output is produced therefrom on line 31, causing AND gate 17 to be rendered nonconductive.

In the embodiment of the sole figure, the output signal appearing on line 32 is connected by means of line 25 to the input of data source 10 for the purpose of "reading out" data stored therein. It has been assumed that a data storage device such as, for example, a magnetic drum is contained within data source 10. On this assumption, as is well known in the art, an output will be produced from data source 10 at terminal 33 thereof upon the application of a "read out" signal applied via line 25.

In operation, upon the occurrence of a reference pulse output from data source 10, appearing on line 29, counters 11 and 12 are referenced to 9 and 90, respectively. Upon the occurrence of a first pulse output from data source 10, appearing on line 28, counters 11 and 12 are placed into a condition corresponding to the count 0, the first pulse output on line 28 corresponding to the count of 0. Counter 11 will count the number of input pulses applied via line 28 and will produce a sequence of output pulses appearing on line 0–9 corresponding to the sequentially increasing count stored therein when the count in counter 11 changes. The output appearing on line 27, produced when the count changes from 9 to 0, is applied to counter 12. Thus, cascaded counters 11 and 12 operate in a conventional fashion to produce sequential first and second groups of signals, appearing on lines 0–9 and on lines 00 through 90, respectively, each group corresponding to a significant figure of the number of pulses applied via line 28.

In the position of switches 13 and 21 shown, an output signal is produced on line 24 when counter 12 has received four successive output pulses (corresponding to the number 30) from counter 11. Upon the occurrence of an output pulse on line 24, flip-flop 19 is placed into a predetermined state of conduction in turn producing a gating signal satisfying one of the two conduction requirements of AND gate 17. Upon the next following signal output, appearing on line 16 (corresponding to the second pulse following the fourth output pulse from counter 11) AND gate 17 will conduct and pass said signal to line 32. Thus, the signal on line 32 will occur simultaneously with the occurrence of the thirty-third input pulse on line 28, it being remembered that the first input pulse on line 28 serves to insert the count of 0 into counters 11 and 12.

Upon the occurrence of an output pulse on line 32, data source 10 is activated, via line 25, to produce an output in conventional fashion at terminal 33 thereof, which output is the pulse information stored in the magnetic drum of data source 10 at the position thereof corresponding to the preselected number of the train of cyclically repetitive pulses on line 28, as determined by the position of the arms 14 and 22 of "units" and "tens" switches 13 and 21, respectively.

It should be noted that while the switches 13 and 21 of the sole figure have been shown as being manually positionable, they can be readily adapted to automatically advance their positions one unit in response to each output pulse occuring on line 32 by adding a stepping coil to switch 13. The stepping coil of unit switch 13 would then be energized by each output signal appearing on line 32, whereby the arm 14 will be advanced one switch position for each successive signal. For example, by means of mechanical coupling techniques well known in the art, switch 21 may be caused to advance to its next position each time arm 14 of switch 13 advances from position 9 to position 0. Thus, the apparatus of the invention will operate, for example, to produce a first output on line 32 when the 33rd input pulse on line 28 occurs following a reference pulse, to produce an output on line 32 when the next following 34th input pulse on line 28 occurs following a reference pulse, and so on.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Means for selecting from a repetitive sequence of pulses a predetermined pulse having a fixed order of sequence relative to a reference pulse, said means comprising a plurality of pulse counters connected in cascade, each counter having an unambiguous capacity equal to the base of the numbering system employed, the first of said counters being adapted to receive said sequence of pulses, each said counter corresponding to a different order significant figure of the total number of pulses in said repetitive sequence, each said counter having an input and producing an output pulse on a discrete output terminal for every number stored therein, each higher order counter being adapted to receive an output pulse from an immediately preceding lower order counter when the unambiguous count of said lower order counter is exceeded, a plurality of selectable switching means corresponding in number to the number of said counters, each switching means having a plurality of inputs and an output and being connected to a respective counter so that each of said inputs is connected to a respective one of said discrete output terminals, each said switching means producing an output pulse upon the concurrence of the position of said switch and a pulse on a predetermined one of said discrete output terminals, an AND gate having first and second inputs and producing an output signal, said first input of said AND gate being connected to the output of the switching means coupled to a lower order counter and said second input of said AND gate being connected to the output of a bistable gate generating means, a first input of said gate generating means being connected to the output of the switching means coupled to a higher order counter and being responsive to the output pulse of said last-named switching means for rendering operative said AND gate, and means for applying said output signal of said AND gate to a second input of said gate generating means, said gate generating means being oppositely responsive thereto relative to the response of said gate generating means to said output signal of said last-named switching means coupled to said higher order counter.

2. Apparatus as defined in claim 1 wherein said means for applying said output of said AND gate to said gate generating means includes pulse delay means.

References Cited in the file of this patent

UNITED STATES PATENTS

| | | |
|---|---|---|
| 2,519,184 | Grosdoff | Aug. 15, 1950 |
| 2,540,654 | Cohen | Feb. 6, 1951 |
| 2,564,824 | White | Aug. 21, 1951 |
| 2,570,306 | Battersby | Oct. 9, 1951 |
| 2,619,282 | Manley | Nov. 25, 1952 |
| 2,665,846 | Gilbert | Jan. 12, 1954 |